Patented Aug. 5, 1941

2,251,806

UNITED STATES PATENT OFFICE

2,251,806

RESINOUS REACTION PRODUCT AND PROCESS THEREFOR

John B. Rust, West Orange, and Irving Pöckel, Montclair, N. J., assignors to Ellis-Foster Company, a corporation of New Jersey No Drawing. Application April 26, 1939, Serial No. 270,150

3 Claims. (Cl. 260—27)

The present invention relates to novel modifications of rosin and other unsaturated natural resins and the process of making same. An object of the invention is to produce reaction products of rosin or its derivatives with the true terpenes such as α- and β-pinene, dipentene, limonene, α-terpinene, α-phellandrene, sylvestrene, and the like. Another object of the invention is to effect the more complete conversion of the crude oleoresin such as is obtained from various species of pine tree into resinous products having a variety of uses. Other objects will become apparent from the following detailed description of the invention.

There have been described (cf: Rummelsburg, U. S. Patent 2,124,675; Schnorf, U. S. Patent 2,074,192; Binapfl, U. S. Patent 2,011,673) methods of hardening or increasing the softening point of rosin and natural resins by treatment with boron fluoride, stannic chloride, aluminum chloride, zinc chloride and the like. Reaction of rosin or its derivatives with formaldehyde and phenols in the presence of one or more of these condensing agents has also been reported. It has now been found that resinous reaction products of rosin, or its derivatives, may be formed by copolymerization with terpenes in the presence of such condensing agents as boron fluoride, aluminum halides, stannic halide and the like. These new reaction products, moreover, are not simple mixtures but rather are chemical combinations, as is shown by their complete solubility in dilute alkali solutions in the case of rosin-terpene reaction products.

Crude oleoresin as obtained from the living pine tree contains a complex mixture of rosin, pinenes, dipentene, limonene and small amounts of a large number of other terpenes. It has now been found that if this crude oleoresin is treated with such condensing agents as boron fluoride and the like, greatly increased yields of resinous material are obtainable. The additional resin appears to result from the copolymerization of rosin with the terpenes present in the oleoresin since the products are completely soluble in dilute aqueous alkali, leaving no residue.

Broadly, the present invention comprises reacting rosin, natural resins, or their derivatives, with terpenes in the presence of boron fluoride, molecular complexes of boron halides with ethers, acids, esters and so forth, stannic chloride and the like.

These products may be conveniently prepared with or without an inert solvent by adding the boron halide at ordinary atmospheric temperature. An exothermic reaction usually occurs which is allowed to proceed for a few minutes to several hours, thereafter decomposing the catalyst with water, alcohol, or by any other suitable means.

Among the natural resins which may be employed are rosin, kauri, dammar, elemi, mastic, congo copal and the like, as well as esters such as glyceryl triabietate, methyl abietate or commercial preparations containing substantial proportions of these materials. The terpenes used may be those listed above as well as alcohols such as terpineol and ketones such as carvone and the like.

Many useful materials may be made from the products of the present invention, several among them being light-stable varnish resins, sizings, adhesives, plasticizers and lacquer and printing ink resins.

The following examples are given to illustrate the process of the present invention and the products which may be obtained. All proportions given are in parts by weight.

EXAMPLE 1.—363 parts of slash pine oleoresin containing approximately 271 parts of rosin and 92 parts of terpenes were dissolved in 322.5 parts of toluol. 12.6 parts of boron trifluoride-ethyl ether complex were added slowly while agitating and cooling the reaction mixture. In the initial stages a rapid exothermic reaction occurred characterized by the liberation of a considerable quantity of heat. The reaction mixture was allowed to stand for 20 hours and then diluted with an equal weight of water. It was steam-distilled to remove the solvent (and any uncombined terpenes) and then heated to 200° C. 359.1 parts of a light-colored brittle resin were obtained, having an acid number of 91.3 and a softening point of 78° C. (ring and ball method). This resin was soluble in raw tung oil and hydrocarbon solvents.

20 parts of the above resin were refluxed with 180 parts of a 2.5% aqueous sodium hydroxide solution for 1 hour. An oily and a clear aqueous layer resulted. Upon refluxing the separated oily layer with 180 parts of water, a clear viscous solution resulted, indicating the complete solubility of the above reaction product in dilute aqueous alkali.

A number of interesting facts may be noted in the preceding example. That a complete chemical reaction occurred between the terpenes and rosin is inferred from the solubility of the sodium salt of the final resin in water. However, it is seen that this sodium salt of the resin is rather difficultly soluble since it was salted out of a 2.5% aqueous alkali solution and only dissolved in pure water after removal of the excess alkali solution. Furthermore, it appears that the molecular weight of the resin is fairly high because the alkali solution was somewhat viscous and on cooling was converted into a gelatinous mass. The yield of resin from the treated oleoresin indicated that a substantial reaction had occurred between the terpenes and rosin. In the above example, the yield of resin was 359.1 parts as compared with a theoretically possible yield of 363. This increased yield of resin from oleoresin represents a great economic advantage since that part of oleoresin giving the largest financial return is the resinous constituent. Furthermore, the resin from the oleoresin treated according to the process of the present invention is more light-, heat- and oxygen-stable than rosin. The origin of the rosin-containing oleoresin is of little moment since all such materials may be treated according to the process of this invention to secure valuable products.

EXAMPLE 2.—371 parts of long leaf pine oleoresin containing approximately 284 parts of rosin and 87 parts of terpenes were dissolved in 330 parts of toluol. 12.5 parts of boron trifluoride-ethyl ether complex were added slowly while agitating and cooling the reaction mixture. In the initial stages a rapid exothermic reaction occurred which was characterized by the liberation of a considerable amount of heat. The reaction mixture was allowed to stand for 20 hours and then diluted with an equal weight of water. It was steam-distilled to remove the solvent and uncombined terpenes and then heated to 200° C. 362.5 parts of a light-colored brittle resin were obtained having an acid number of 133 and a softening point of 70° C. (ring and ball method).

This resin was soluble in raw tung oil and hydrocarbon solvents. Its sodium salt, prepared by refluxing 20 parts of the above product and 180 parts of a 2.5% aqueous sodium hydroxide solution, was soluble in water.

EXAMPLE 3.—200 parts of WW rosin and 91 parts of alpha pinene were dissolved in 200 parts of toluol. 9.7 parts of a boron trifluoride-ethyl ether complex were added slowly while agitating and cooling the reaction mixture. In the initial stages a rapid exothermic reaction occurred. The reaction mixture was allowed to stand for 20 hours and then diluted with an equal quantity of water. It was then steam-distilled to remove the solvent and uncombined terpenes and heated to 200° C. 240 parts of a light-colored brittle resin were obtained having an acid number of 93 and a softening point of 65° C. (ring and ball method).

The resin was soluble in raw tung oil and hydrocarbon solvents. Its sodium salt, prepared by refluxing 20 parts of the above resin and 180 parts of a 2.5% aqueous sodium hydroxide solution, was completely soluble in water.

EXAMPLE 4.—100 parts of WW rosin and 100 parts of dipentene were dissolved in 100 parts of toluol. 6.7 parts of a boron trifluoride-ethyl ether complex were added slowly while agitating and cooling the reaction mixture. The reaction mixture was allowed to stand for 20 hours and then diluted with an equal amount of water. It was steam-distilled to remove the solvent and uncombined terpenes and heated to 200° C. 153 parts of a light-colored brittle resin were obtained having a softening point of 67° C. (ring and ball method) and an acid number of 106.

The resin was soluble in hydrocarbon solvents and raw tung oil. Its sodium salt was completely soluble in water.

EXAMPLE 5.—200 parts of WW rosin and 200 parts of turpentine were dissolved in 200 parts of toluol. 13.3 parts of a boron trifluoride-ethyl ether complex were added slowly while agitating and cooling the reaction mixture. The reaction mixture was allowed to stand for 2 hours (until the initial reaction had subsided) and then refluxed at 90°–100° C. for 3 hours. The reaction mixture was diluted with an equal weight of water and steam-distilled to remove the solvent and unreacted turpentine. It was then heated to 150° C. to dehydrate. 318.7 parts of a light-colored hard resin resulted having an acid number of 82 and a softening point of 53° C. (ring and ball method).

The resin was soluble in raw tung oil and hydrocarbon solvents. Its sodium salt was completely soluble in water.

The products of the present invention may be esterified with mono- or polyhydric alcohols, or their acidity may be reduced by reaction with lime or the like. The rosin component may be esterified before or after reaction with the terpene. In the following example the product which is formed may be advantageously used as a plasticizer for cellulose derivatives because of its soft character and superior light- and oxygen-stability.

EXAMPLE 6.—200 parts of methyl abietate and 200 parts of dipentene were dissolved in 100 parts of toluol. 12.5 parts of a 45% boron trifluoride-ethyl ether complex were added slowly while cooling and agitating the reaction mixture. After 20 hours, the reaction mixture was diluted with water and steam-distilled to remove the unreacted dipentene and the solvent. After heating to 150° C. to dehydrate, 335.5 parts of a soft, sticky, light-colored resinous mass were obtained.

The resinous product was soluble in raw tung oil and hydrocarbon solvents but not soluble in dilute aqueous alkali unless completely saponified.

Besides rosin and the natural oleoresins, certain other unsaturated natural resins may be reacted according to the process of the present invention with terpenes.

EXAMPLE 7.—200 parts of dammar gum and 200 parts of alpha pinene were dissolved in 200 parts of toluol. 12.5 parts of a 45% boron trifluoride-ethyl ether complex were slowly added while agitating and cooling the reaction mixture. The reaction mixture was then refluxed at 90–95° C. for 3 hours and diluted with water. After steam-distilling to remove the solvent and unreacted terpenes, it was heated to 150° C. to dehydrate. 335 parts of a soft resinous product resulted having an acid number of 17.6 and a softening point of 42° C.

The resulting resin was soluble in hydrocarbon solvents and raw tung oil.

EXAMPLE 8.—200 parts of ester gum and 200 parts of dipentene were dissolved in 200 parts of toluol. 12.5 parts of a 45% boron trifluoride-diethyl ether complex were added slowly while agitating and cooling the reaction mixture. At the end of 20 hours the reaction product was diluted with water and steam-distilled to remove the solvent. The resinous mass was heated to 150° C. to dehydrate, resulting in 333 g. of a hard brittle resin having a softening point of 66° C.

The resin was soluble in raw tung oil and hydrocarbon solvents.

EXAMPLE 9.—200 parts of WW rosin and 200 parts of alpha terpinene were dissolved in 200 parts of toluol. 13.3 parts of a 45% boron trifluoride-diethyl ether complex were added slowly while agitating the reaction mixture. The reaction mixture was agitated at 25° C. for 1 hour and refluxed at 90-95° C. for 3 hours to complete the reaction. The reaction product was steam-distilled to remove the solvent and then heated to 150° C. to dehydrate it. 295 parts of a hard, light-colored resin were obtained having a softening point of 44° C. (ring and ball method) and an acid number of 103.

The resin was soluble in raw tung oil and hydrocarbon solvents. Its sodium salt was completely soluble in water.

Although boron trifluoride is the preferred catalyst of the present invention, since light-colored, higher melting materials are secured, other condensing agents such as stannic halides, aluminum halides, sulphuric acid and the like may be employed.

EXAMPLE 10.—100 parts of WW rosin and 100 parts of alpha pinene were dissolved in 100 parts of toluol. 5 parts of anhydrous stannic chloride in 20 parts of acetone were added slowly while cooling and agitating. After 20 hours the reaction product was diluted with water and steam-distilled to remove the solvent and unreacted terpene. After heating to 150° C. to dehydrate, 118.5 parts of a light-colored brittle resin were obtained having an acid number of 112 and a softening point of 88° C.

The resulting resin was soluble in drying oils and hydrocarbon solvents. The sodium salt of this resin was completely soluble in water.

To study the action of boron fluoride on the individual components of the reaction products of the present invention, the following examples are given.

EXAMPLE 11.—Rosin treatment.—200 parts of WW rosin were dissolved in 100 parts of toluene and 6.7 parts of boron trifluoride-ethyl ether complex (containing 45% boron trifluoride) were added slowly while agitating and cooling the solution. A slight exothermic reaction occurred and the solution was allowed to stand for 20 hours at room temperature, then diluted with water. Steam-distillation removed the solvent and the resin was finally heated to 150° C. to dehydrate. 198 parts of a light-colored brittle resin having an acid number of 175 and a softening point of 83° C. (ball and ring method) were obtained. The resin was completely soluble in dilute akali solution.

EXAMPLE 12.—Terpene treatment.—6.7 parts of a 45% boron trifluoride-ethyl ether complex were slowly added to a solution of 200 parts of turpentine in 100 parts of toluene. An exothermic reaction occurred and the solution after naturally cooling to room temperature was allowed to stand for 20 hours. It was then diluted with water and steam-distilled to remove the solvent and unreacted terpenes. After dehydration at 150° C., 62.8 parts of a viscous yellow oil were obtained which was totally insoluble in aqueous alkali.

From the above examples it is evident that if the reaction products of the present invention were merely physical mixtures the liquid terpene component would not be soluble in alkali and hence an insoluble residue would result. The fact that such is not the case indicates that a complete chemical reaction occurs in the process of the present invention between the unsaturated natural resin and liquid terpenes. Furthermore, the yield of oily, steam-non-volatile material in Example 12 indicates an incomplete and rather limited reaction of the terpene itself, showing that a novel type of reaction in all probability occurs with the natural resin and terpene by the process of the present invention.

A physical mixture of the products of Examples 11 and 12 does not have the properties of the reaction products here described.

EXAMPLE 13.—30 parts of the product of Example 11 and 17.8 parts of the product of Example 12 were warmed together to about 120° C. The proportions of the ingredients in the mixture are the same as the reacted terpene and rosin in Example 5. A soft, clear mixture resulted, having an acid number of 93 and softening point 41° C. It was not completely soluble in dilute alkali solution.

What we claim is:

1. The process which comprises reacting rosin with a terpene in the presence of a boron halide condensing agent; whereby a reaction product is obtained which is characterized by the complete solubility of its alkali salt in water.

2. The process which comprises reacting rosin and turpentine in the presence of a boron fluoride compound, whereby a reaction product is obtained which is characterized by the complete solubility of its alkali salt in water.

3. The process which comprises reacting natural pine oleoresin with boron fluoride under conditions for copolymerizing natural resin acid and terpene contained therein, whereby enhanced yields of resinous material are secured.

JOHN B. RUST.
IRVING PÖCKEL.

DISCLAIMER 2,251,806.—*John B. Rust*, West Orange, and *Irving Pöckel*, Montclair, N. J. RESIN-
OUS REACTION PRODUCT AND PROCESS THEREFOR. Patent dated August 5,
1941. Disclaimer filed April 23, 1943, by the assignee, *Ellis-Foster Company*.
Hereby enters this disclaimer to claim 1.

[*Official Gazette June 8, 1943.*]